United States Patent
Sikder et al.

(10) Patent No.: US 12,221,182 B2
(45) Date of Patent: Feb. 11, 2025

(54) ONLINE ESTIMATION METHODS AND SYSTEMS FOR ELECTRIC POWER STEERING PARAMETERS FOR USE IN AUTOMATED DRIVING CONTROLS

(71) Applicant: GM GLOBAL TECHNOLOGY OPERATIONS LLC, Detroit, MI (US)

(72) Inventors: Tushita Arun Sikder, Windsor (CA); Jackson Barry McGrory, Mississauga (CA); Jimmy Lu, Markham (CA); Mohammadali Shahriari, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 222 days.

(21) Appl. No.: 18/065,894

(22) Filed: Dec. 14, 2022

(65) Prior Publication Data
US 2024/0199113 A1    Jun. 20, 2024

(51) Int. Cl.
*B62D 6/00*    (2006.01)
*B62D 15/02*    (2006.01)

(52) U.S. Cl.
CPC ............. *B62D 6/00* (2013.01); *B62D 15/021* (2013.01)

(58) Field of Classification Search
CPC ................................ B62D 6/00; B62D 15/021
See application file for complete search history.

(56) References Cited

U.S. PATENT DOCUMENTS

| | | | | |
|---|---|---|---|---|
| 2006/0025896 A1* | 2/2006 | Traechtler | | B62D 7/159 701/1 |
| 2006/0074541 A1* | 4/2006 | Ono | | B60T 8/172 701/80 |
| 2008/0091318 A1* | 4/2008 | Deng | | B62D 6/003 701/41 |
| 2008/0306658 A1* | 12/2008 | Beisheim | | B60R 21/01516 701/46 |
| 2009/0150028 A1* | 6/2009 | Bernzen | | B60R 21/0132 701/45 |
| 2012/0078470 A1* | 3/2012 | Hirao | | B60W 10/22 701/1 |
| 2013/0338878 A1* | 12/2013 | Fritz | | B60W 10/20 701/1 |

(Continued)

FOREIGN PATENT DOCUMENTS

| | | | | |
|---|---|---|---|---|
| CN | 111391916 A | * | 7/2020 | ............ B62D 6/00 |
| DE | 102012212301 A1 | | 1/2013 | |
| DE | 102014118120 A1 | | 6/2015 | |

(Continued)

*Primary Examiner* — Joseph J Dallo
(74) *Attorney, Agent, or Firm* — Lorenz & Kopf LLP

(57) ABSTRACT

Methods and systems are provided for controlling a vehicle comprising an Electric Power Steering System (EPS). In an embodiment, a method includes determining, by the processor, a lateral acceleration reference based on reference path data and vehicle dynamics data; determining, by the processor, coefficient data based on at least one of measured lateral acceleration data and measured steering angle data, and measured torque data; determining, by the processor, a torque command based on the coefficient and the reference lateral acceleration data; and generating, by the processor, a steering command to the EPS based on the torque command.

14 Claims, 3 Drawing Sheets

(56) References Cited

U.S. PATENT DOCUMENTS

2014/0005875 A1\* 1/2014 Hartmann .............. G08G 1/165
    701/1
2014/0074388 A1\* 3/2014 Bretzigheimer ... B62D 15/0275
    701/117

FOREIGN PATENT DOCUMENTS

| DE | 102017108692 A1 | 10/2017 | |
|----|-----------------|---------|---|
| DE | 102019100035 A1 | 7/2019  | |
| WO | WO-2020131225 A1 \* | 6/2020 | ............ B60W 10/04 |

\* cited by examiner

ONLINE ESTIMATION METHODS AND SYSTEMS FOR ELECTRIC POWER STEERING PARAMETERS FOR USE IN AUTOMATED DRIVING CONTROLS

INTRODUCTION

The present disclosure generally relates to automated lateral control of a vehicle and associated methods and systems.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from systems such as global positioning systems (GPS) to navigate. However, it may be desirable to improve control of an autonomous vehicle, for example in controlling steering of an autonomous vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, lane keeping control, lane centering control and parking assistance systems correspond to lower automation levels, while true "driverless" vehicles correspond to higher automation levels. Various automated driver assistance systems of different automation levels rely on effective lateral control of the vehicle through a steering system.

An electric power steering system (EPS) provides steering assistance through a motor based on a requested torque. The requested torque is achieved through a torque command that is determined based on one or more sensed parameters of the steering system. In some instances, one of the sensed parameters, such as side slip angle, may not be available for use in determining the torque command.

Accordingly, it is desirable to provide methods and systems for determining a torque command when a sensed parameter is unavailable and for controlling the steering system based thereon. Furthermore, other desirable features and characteristics of the present invention will be apparent from the subsequent detailed description and the appended claims, taken in conjunction with the accompanying drawings and the foregoing technical field and background.

SUMMARY

Methods and systems are provided for controlling a vehicle comprising an Electric Power Steering System (EPS). In an embodiment, a method includes: determining, by the processor, a lateral acceleration reference based on reference path data and vehicle dynamics data; determining, by the processor, coefficient data based on at least one of measured lateral acceleration data and measured steering angle data, and measured torque data; determining, by the processor, a torque command based on the coefficient and the reference lateral acceleration data; and generating, by the processor, a steering command to the EPS based on the torque command.

The method of claim 1, further comprising defining, by a processor, a first linear model based on the measured lateral acceleration data, wherein the coefficient data is associated with the first linear model.

In various embodiments, the method includes defining, by a processor, a second linear model based on the measured steering angle data, wherein the coefficient data is associated with the second linear model.

In various embodiments, the method includes defining, by a processor, defining a second linear model based on the measured steering angle data, wherein the coefficient data is based on a blending method between the first linear model and the second linear model.

In various embodiments, the blending method is based on vehicle velocity.

In various embodiments, the coefficient data of the at least one of the first linear model and the second linear model is based on an adaptive filtering method.

In various embodiments, the method includes resetting at least one of an initial guess and a confidence value based on a change in the steering system.

In various embodiments, the method includes determining when conditions associated with vehicle speed, lateral acceleration, yaw rate, steering wheel angle, torque command and sensor diagnostics have been met, and wherein the determining the coefficient data is in response to the determining when the conditions have been met.

In various embodiments, the determining the reference lateral acceleration is based on:

$$A_{y,ref} = \frac{V_x^2 \delta_{ref} + Lg \sin \Phi_r}{L + K_{us} V_x^2},$$

where V represents the vehicle velocity, g represents gravity, $\delta_{ref}$ represents a steering angle reference, L represents a vehicle wheelbase, $\Phi_r$ represents a road bank angle, and $K_{us}$ represents a vehicle understeer coefficient.

In various embodiments, the determining the reference lateral acceleration is based on:

$$A_{y,ref} = V_x^2 K_{path} + g\sin\Phi_r,$$

where V represents vehicle velocity, g represents gravity, $\Phi_r$ represents a road bank angle, and $K_{path}$ represents a path curvature.

In another embodiment, a vehicle control system includes: a non-transitory computer readable medium comprising program instructions; and at least one processor in operable communication with the non-transitory computer readable medium, the at least one processor configured to execute the program instructions, wherein the program instructions are configured to cause the at least one processor to: determine a lateral acceleration reference based on reference path data and vehicle dynamics data; determine coefficient data based on at least one of measured lateral acceleration data and measured steering angle data, and measured torque data; determine a torque command based on the coefficient and the reference lateral acceleration data; and generate a steering command to the EPS based on the torque command.

In various embodiments, the programming instructions are further configured to define a first linear model based on the measured lateral acceleration data, wherein the coefficient data is associated with the second linear model.

In various embodiments, the programming instructions are further configured to define a second linear model based on the measured steering angle data, wherein the coefficient data is associated with the second linear model.

In various embodiments, the programming instructions are further configured to define a second linear model based on the measured steering angle data, wherein the coefficient data is based on blending method between the first linear model and the second linear model.

In various embodiments, the blending method is based on vehicle velocity.

In various embodiments, wherein the coefficient data of the at least one of the first linear model and the second linear model is based on an adaptive filtering method.

In various embodiments, the programming instructions are further configured to reset at least one of an initial guess and a confidence value based on a change in the steering system.

In various embodiments, the programming instructions are further configured to determine when conditions associated with vehicle speed, lateral acceleration, yaw rate, steering wheel angle, torque command and sensor diagnostics have been met, and wherein determine the coefficient data is in response to the determining when the conditions have been met.

In various embodiments, the programming instructions are configured to determine the reference lateral acceleration based on:

$$A_{y,ref} = \frac{V_x^2 \delta_{ref} + Lg \sin \Phi_r}{L + K_{us} V_x^2},$$

where V represents the vehicle velocity, g represents gravity, $\delta_{ref}$ represents a steering angle reference, L represents a vehicle wheelbase, $\Phi_r$ represents a road bank angle, and $K_{us}$ represents a vehicle understeer coefficient.

In various embodiments, the programming instructions are configured to determine the reference lateral acceleration based on:

$$A_{y,ref} = V_x^2 K_{path} + g\sin\Phi_r,$$

where V represents vehicle velocity, g represents gravity, $\Phi_r$ represents a road bank angle, and $K_{path}$ represents a path curvature.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
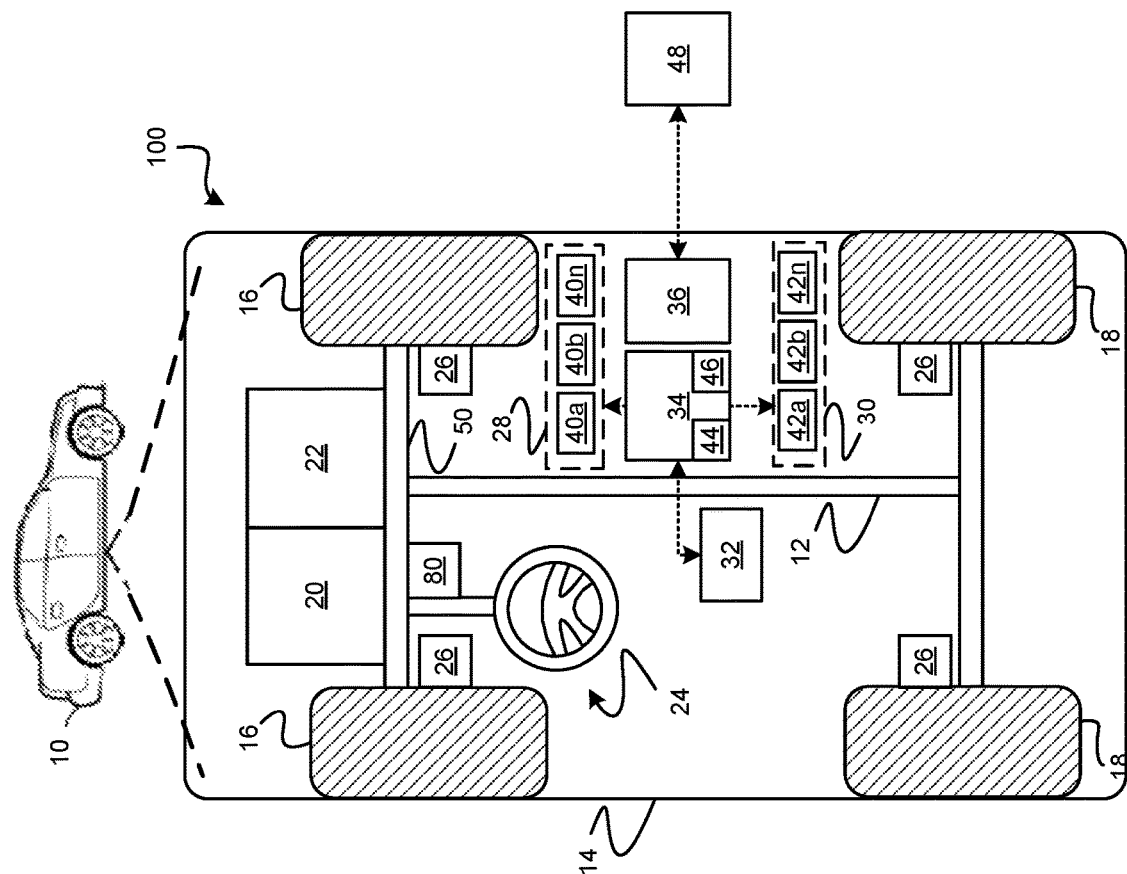
FIG. 1 is a functional block diagram illustrating a vehicle having a lateral vehicle control system, in accordance with various embodiments.

With reference to FIG. 1, a lateral vehicle control system shown generally at 100 is associated with a vehicle 10 in accordance with various embodiments. In general, the lateral vehicle control system 100 uses an adaptive model to relate a torque command with estimated parameters that the torque achieves. The estimated model parameters are used for feedforward torque control to improve the robustness of a steering controller, for example, under conditions the steering controller wasn't directly calibrated for, such as trailering, temperature changes, or changes in tire wear.

As depicted in FIG. 1, the vehicle 10 generally includes a chassis 12, a body 14, front wheels 16, and rear wheels 18. The vehicle 10 is depicted in the illustrated embodiment as a passenger car, but it should be appreciated that the lateral vehicle control system 100 may be included within any other vehicle including trucks, sport utility vehicles (SUVs), recreational vehicles (RVs), etc., can also be used.

In various embodiments, the body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The propulsion system 20 is configured to generate power to propel the vehicle. The propulsion system 20 may, in various embodiments, include an internal combustion engine, an electric machine such as a traction motor, a fuel cell propulsion system, and/or any other type of propulsion configuration. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16-18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16.

The steering system 24 includes an electric power steering (EPS) system 80 that includes an electric steering motor. The electric steering motor provides electric steering assist in response to a vehicle driver turning the steering wheel and/or the autonomous control system determining a lateral control signal. In other words, the EPS system 80 is configured to turn the wheels 16 the amount commanded by the driver/control system so that the turning of the wheels 16 on the roadway is easier. As is understood by one of ordinary skill in the art, the EPS system 80 electrically assists a driver in the steering of the vehicle 10 by applying a motor torque command to the steering motor during an EPS-assisted steering maneuver. As can be appreciated, such assisted steering maneuvers associated with an autonomous or semi-autonomous system can include, but are not limited to, collision avoidance steering, lane keeping assist steering, and other ADAS features.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. In various embodiments, the sensing devices 40a-40n include an HWA (Hand Wheel Angle or Road Wheel Angle) sensor, a steering torque sensor, and/or one or more vehicle dynamics sensors. The HWA sensor provides a measure of the angle of the steering wheel. For example, the HWA sensor may be a steering angle sensor mounted to a steering column that measures the rotation of the steering wheel and the steering column and provides a steering angle signal indicative of same. A driver applied torque sensor may be mounted to the steering column that measures the torque on the steering column and provides a torque signal indicative of same. Alternately, instead of using a steering angle sensor to provide the steering angle, a pinion angle (PA) sensor can be employed to provide the steering angle, which gives a more direct measurement of road wheel angle, as is well understood by those skilled in the art.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16-18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate.

The actuator system 30 includes one or more actuator devices 42a-42n that control one or more vehicle features such as, but not limited to, the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, one or more instructions of the controller 34 are embodied in the lateral vehicle control system 100 and, when executed by the processor 44, implement the lateral vehicle control system 100 and methods described with respect to FIGS. 2 and 3. In particular, the instructions of the controller 34 model estimated parameters such as self-aligning torque of the steering system without requiring certain a measurement of slip angle in order to improve robustness of the control.

Figure 2:
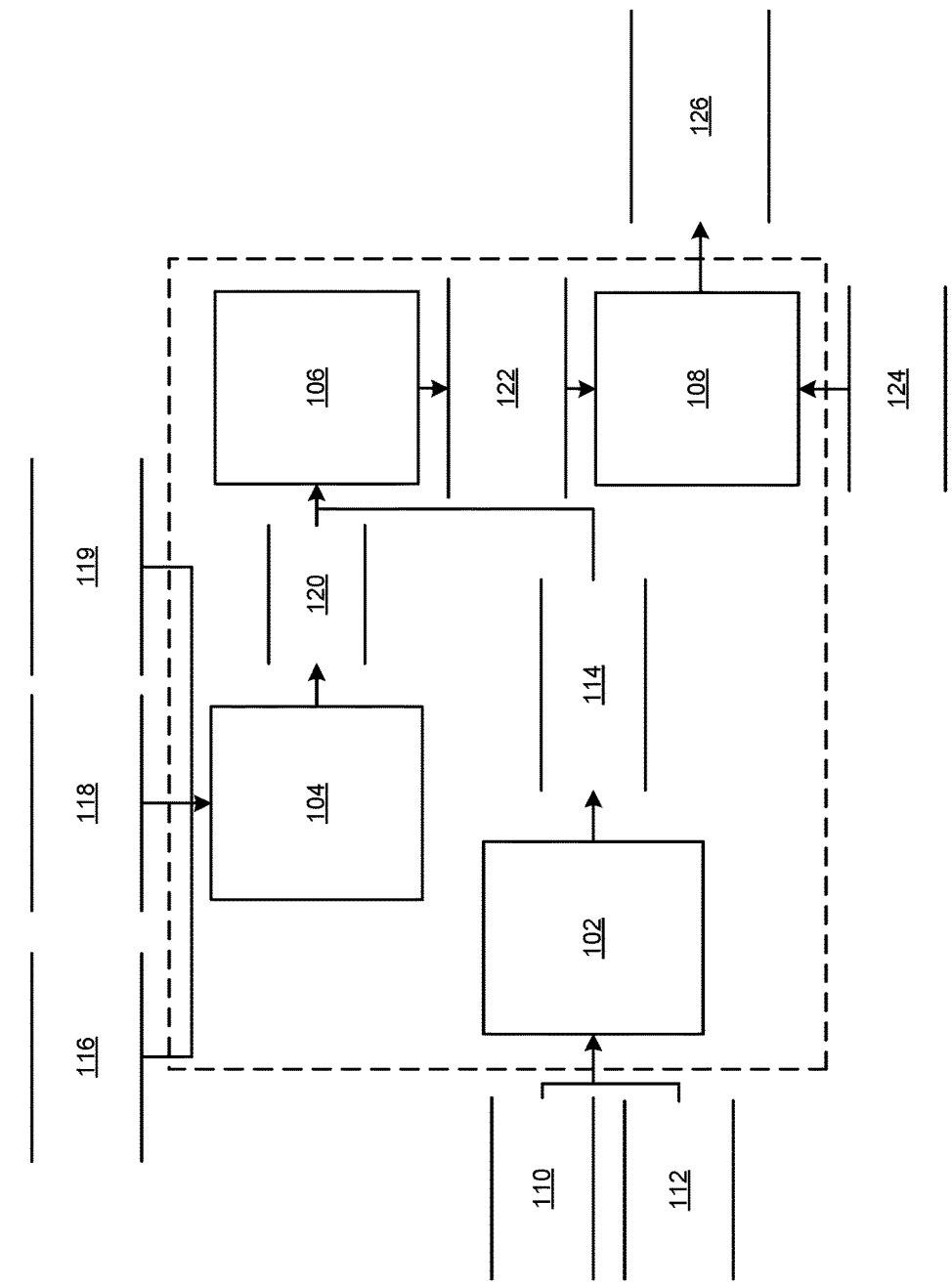
FIG. 2 is a diagram of a lateral vehicle control system, in accordance with various embodiments.

Referring now to FIG. 2 and with continued reference to FIG. 1, a dataflow diagram illustrates various embodiments of lateral vehicle control system 100 which may be embedded within the controller 34 of FIG. 1 in accordance with various embodiments. Inputs to lateral vehicle control system 100 may be received from the sensor system 28, received from other control modules (not shown) associated with the vehicle 10, received from the communication system 36, and/or determined/modeled by other sub-modules (not shown) within the controller 34. As can be appreciated, the sub-modules shown in FIG. 2 may be combined and/or further partitioned to similarly generate control signals for controlling steering of the vehicle 10. Inputs to the controller 34 may be received from the sensor system 28, received from other control modules (not shown) of the vehicle 10, and/or determined by other sub-modules (not shown) of the controller 34. In various embodiments, the controller 34 includes a reference lateral acceleration determination module 102, a self-aligning torque coefficient determination module 104, a feedforward torque determination module 106, and a total torque determination module 108.

The reference lateral acceleration determination module 102 receives as input reference path data 110, and vehicle dynamics data 112. In various embodiments, the reference path data 110 includes information about the determined path to follow including road feature data such as but not limited to, road bank angle, road curvature, steering angle reference, etc. In various embodiments, the vehicle dynamics data 112 includes information about the vehicle 10 such as, but not limited to vehicle velocity. The reference lateral acceleration determination module 102 computes a reference lateral acceleration associated with the reference steering angle in order to achieve the desired path and generates reference lateral acceleration data 114 based thereon.

For example, the reference lateral acceleration determination module 102 computes a reference lateral acceleration $A_{y,ref}$ by converting the steering angle reference using vehicle dynamics and the relationship:

$$A_{y,ref} = \frac{V_x^2 \delta_{ref} + Lg \sin \Phi_r}{L + K_{us} V_x^2}, \quad (1)$$

where V represents the vehicle velocity, g represents gravity, $\delta_{ref}$ represents the steering angle reference, L represents the vehicle wheelbase, $\Phi_r$ represents the road bank angle, and $K_{us}$ represents a vehicle understeer coefficient.

In another example, the reference lateral acceleration determination module computes the reference lateral acceleration $A_{y,ref}$ based on reference path characteristics and the relationship:

$$A_{y,ref} = V_x^2 K_{path} + g\sin\Phi_r \quad (2)$$

where V represents the vehicle velocity, g represents gravity, $\Phi_r$ represents the road bank angle, and $K_{path}$ represents the path curvature.

The self-aligning torque coefficient determination module 104 receives as input measured lateral acceleration data 116, measured steering angle data 118, and measured steering torque data 119. The self-aligning torque coefficient determination module 104 determines one or more self-aligning torque coefficients and generates coefficient data 120 based thereon. For example, the self-aligning torque coefficient determination module 104 determines a self-aligning torque coefficient $K_s$ corresponding to one or more linear models using adaptive filtering techniques such as, but not limited to, a recursive least squares (RLS) method. As can be appreciated, the linear model(s) may be predefined and/or learned in real-time. For example, a first model relates the measured steering torque with the measured lateral acceleration. The self-aligning torque coefficient determination module 104 uses the first model to determine a coefficient $K_{s,A_y}$. In another example, a second model relates the measured steering torque with the measured steering angle. The self-aligning torque coefficient determination module 104 uses second model to determine a coefficient $K_{s,\theta}$.

In various embodiments, the self-aligning torque coefficient determination module 104 resets the initial guess and/or confidence values used in the RLS models under various conditions that suggest a drastic change in the steering system's behavior, thus causing the estimator to converge to an updated estimate of the parameter more rapidly. In various embodiments, the self-aligning torque coefficient determination module 104 computes the self-aligning torque coefficients when various conditions based on vehicle speed, lateral acceleration, yaw rate, steering wheel angle, torque command and other sensor diagnostics have been met.

The feedforward torque determination module 106 receives as input the coefficient data 120, and the reference lateral acceleration data 114. The feedforward torque determination module 106 determines a feedforward torque and generates feedforward control torque data 122 based thereon. For example, the feedforward torque determination module 106 computes the feedforward torque $\tau_{ff}$ based on a product of the coefficient $K_s$ and the reference lateral acceleration $A_{y,ref}$ using the relationship:

$$\tau_{ff} = K_s A_{y,ref}. \quad (3)$$

In various embodiments, when the coefficient data 120 includes the coefficient $K_{s,A_y}$, the feedforward torque is determined using the relationship:

$$\tau_{ff} = K_{s,A_y} A_{y,ref}. \quad (4)$$

In various embodiments, when the coefficient data 120 includes the $K_{s,\theta}$, the feedforward torque is determined using the relationship:

$$\tau_{ff} = K_{s,\theta} A_{y,ref}. \quad (5)$$

In various embodiments, when the coefficient data 120 includes both coefficients, $K_{s,A_y}$ and $K_{s,\theta}$, the feedforward torque determination module 106 determines the feedforward torque based on a blending method that blends the use of the different computed feed forward torques based on, for example, the vehicle speed or some other vehicle dynamics.

For example, when the vehicle speed is greater than a defined threshold, the feedforward torque is computed using relationship (4) where self-aligning torque is the dominant physical phenomenon, and when the vehicle speed is less than the threshold, the feedforward torque is computed using relationship (5) to capture the effects of friction and damping.

The total torque determination module 108 receives as input the feedforward control torque data 122, and feedback control torque data 124. In various embodiments, the feedback control torque is determined based on a steering angle reference and a measured steering angle.

The total torque determination module 108 determines a total torque based on the feedforward torque and the feedback torque and generates commanded total torque data 126 based thereon. For example, the total torque determination module 108 computes the total torque $\tau_{total}$ using the relationship:

$$\tau_{total} = \tau_{ff} + \tau_{fb}, \quad (6)$$

where $\tau_{fb}$ represents the feedback torque. As such, the system of FIG. 2 provides exemplary embodiments for generating the total torque command using an unknown parameters that is estimated online where an estimated lateral acceleration value is used in place of a tire slip angle to enable self-aligning torque properties from first principles.

Figure 3:
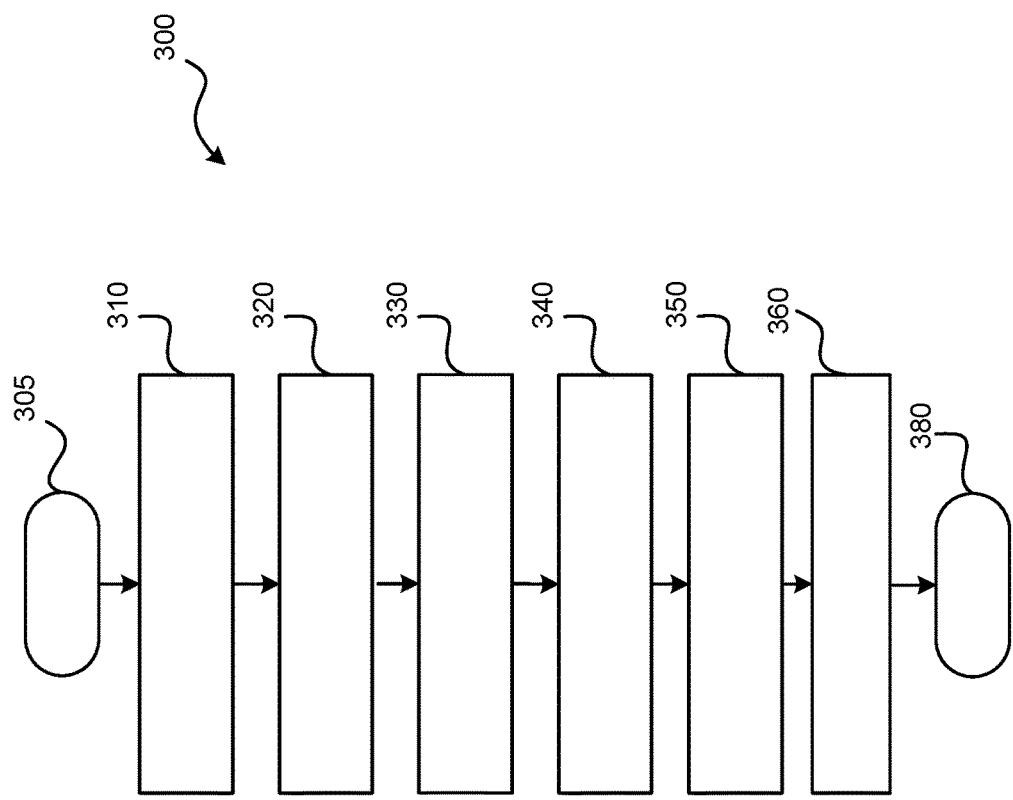
FIG. 3 is a flowchart illustrating a lateral vehicle control method for controlling the vehicle, in accordance with various embodiments.

Referring now to FIG. 3 and with continued reference to FIGS. 1-2, a flowchart illustrates a process 300 that can be performed by the lateral vehicle control system 100 of FIG. 1 in accordance with the present disclosure. As can be appreciated in light of the disclosure, the order of operation within the process 300 is not limited to the sequential execution as illustrated in FIG. 3, but may be performed in one or more varying orders as applicable and in accordance with the present disclosure. In various embodiments, the process 300 can be scheduled to run based on one or more predetermined events, and/or can run continuously during operation of the vehicle 10, and/or may be run offline prior to operation of the vehicle 10.

In one embodiment, the process 300 may begin at 305. The reference path data is received at 310. The reference lateral acceleration to achieve the reference path is determined at 320. The self-aligning torque coefficient(s) is determined using one or more of the linear models (e.g., when vehicle conditions have been met) as discussed above at 330. The feedforward control torque is determined, for example, based on the relationships (4) and/or (5) as discussed above at 340. The total torque is then determined based on the feedforward control torque and a feedback control torque, for example, based on relationship (6) at 350. The total torque is generated to the steering system 24 to control the vehicle 10 according to the reference path at 360. Thereafter, the process 300 may end at 370.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of automated lateral control of a vehicle comprising an Electric Power Steering System (EPS), the method comprising:
determining, by a processor of an autonomous control system, a lateral acceleration reference associated with a reference steering angle to achieve a desired path to follow based on reference path data and vehicle dynamics data, the reference path data comprising at least one of a road bank angle and a path curvature;
determining, by the processor, a model estimated self-aligning torque coefficient based on measured torque data and at least one of measured lateral acceleration data and measured steering angle data using a linear model, wherein the model estimated self-aligning torque coefficient is based on the measured lateral acceleration data when a vehicle speed is less than a threshold and the model estimated self-aligning torque coefficient is based on the measured steering angle data when the vehicle speed is greater than the threshold;

determining, by the processor, a feedforward control torque based on a product of the lateral acceleration reference and the model estimated self-aligning torque coefficient;

determining, by the processor, a total torque command based on a sum of the feedforward control torque and a feedback control torque; and generating, by the processor, a steering command to the EPS to control the vehicle according to the desired path based on the total torque command.

2. The method of claim 1, further comprising defining, by the processor, a first linear model based on the measured lateral acceleration data, wherein the model estimated self-aligning torque coefficient is associated with the first linear model.

3. The method of claim 1, further comprising defining, by the processor, a second linear model based on the measured steering angle data, wherein the model estimated self-aligning torque coefficient is associated with the second linear model.

4. The method of claim 2, further comprising defining, by the processor, a second linear model based on the measured steering angle data, wherein the model estimated self-aligning torque coefficient is based on blending method between the first linear model and the second linear model.

5. The method of claim 4, wherein the blending method is based on vehicle velocity.

6. The method of claim 4, wherein the model estimated self-aligning torque coefficient of the at least one of the first linear model and the second linear model is based on an adaptive filtering method.

7. The method of claim 1, wherein the determining the lateral acceleration reference is based on:

$$A_{y,ref} = \frac{V_x^2 \delta_{ref} + Lg \sin \Phi_r}{L + K_{us}V_x^2},$$

where V represents vehicle velocity, g represents gravity, $\delta_{ref}$ represents a steering angle reference, L represents a vehicle wheelbase, $\Phi_r$ represents the road bank angle, and $K_{us}$ represents a vehicle understeer coefficient.

8. The method of claim 1, wherein the determining the lateral acceleration reference is based on:

$$A_{y,ref} = V_x^2 K_{path} + g\sin\Phi_r,$$

where V represents vehicle velocity, g represents gravity, $\Phi_r$ represents the road bank angle, and $K_{path}$ represents the path curvature.

9. A vehicle control system, comprising:
a non-transitory computer readable medium comprising program instructions; and
at least one processor in operable communication with the non-transitory computer readable medium, the at least one processor configured to execute the program instructions, wherein the program instructions are configured to cause the at least one processor to:
determine a lateral acceleration reference associated with a reference steering angle to achieve a desired path to follow based on reference path data and vehicle dynamics data, the reference path data comprising at least one of a road bank angle and a path curvature;

determine a model estimated self-aligning torque coefficient based on measured torque data and at least one of measured lateral acceleration data and measured steering angle data using a linear model, wherein the model estimated self-aligning torque coefficient is based on the measured lateral acceleration data when a vehicle speed is less than a threshold and the model estimated self-aligning torque coefficient is based on the measured steering angle data when the vehicle speed is greater than the threshold;

determine a feedforward control torque based on a product of the lateral acceleration reference and the model estimated self-aligning torque coefficient;

determine a total torque command based on a sum of the feedforward control torque and a feedback control torque; and generate a steering command to an Electric Power Steering System (EPS) to control the vehicle according to the desired path based on the total torque command.

10. The vehicle control system of claim 9, wherein the lateral acceleration reference comprises $$A_{y,ref} = \frac{V_x^2 \delta_{ref} + Lg \sin \Phi_r}{L + K_{us}V_x^2},$$

where V represents vehicle velocity, g represents gravity, $\delta_{ref}$ represents a steering angle reference, L represents a vehicle wheelbase, $\Phi_r$ represents the road bank angle, and $K_{us}$ represents a vehicle understeer coefficient.

11. The vehicle control system of claim 9, wherein the lateral acceleration reference comprises $$A_{y,ref} = V_x^2 K_{path} + g\sin\Phi_r,$$

where V represents vehicle velocity, g represents gravity, $\Phi_r$ represents the road bank angle, and $K_{path}$ represents the path curvature.

12. A non-transitory computer-readable medium comprising executable instructions that, when executed by a processor, cause the processor to:
determine a lateral acceleration reference associated with a reference steering angle to achieve a desired path to follow based on reference path data and vehicle dynamics data, the reference path data comprising at least one of a road bank angle and a path curvature;
determine a model estimated self-aligning torque coefficient based on measured torque data and at least one of measured lateral acceleration data and measured steering angle data using a linear model, wherein the model estimated self-aligning torque coefficient is based on the measured lateral acceleration data when a vehicle speed is less than a threshold and the model estimated self-aligning torque coefficient is based on the measured steering angle data when the vehicle speed is greater than the threshold;
determine a feedforward control torque based on a product of the lateral acceleration reference and the model estimated self-aligning torque coefficient;

determine a total torque command based on a sum of the feedforward control torque and a feedback control torque; and generate a steering command to an Electric Power Steering System (EPS) to control the vehicle according to the desired path based on the total torque command.

13. The non-transitory computer-readable medium of claim 12, wherein the lateral acceleration reference comprises $$A_{y,ref} = \frac{V_x^2 \delta_{ref} + Lg\sin\Phi_r}{L + K_{us} V_x^2},$$

where V represents vehicle velocity, g represents gravity, $\delta_{ref}$ represents a steering angle reference, L represents a vehicle wheelbase, $\Phi_r$ represents the road bank angle, and $K_{us}$ represents a vehicle understeer coefficient.

14. The non-transitory computer-readable medium of claim 12, wherein the lateral acceleration reference comprises $A_{y,ref} = V_x^2 K_{path} + g \sin \Phi_r$, where V represents vehicle velocity, g represents gravity, $\Phi_r$ represents the road bank angle, and $K_{path}$ represents the path curvature.

* * * * *